Figure 1:
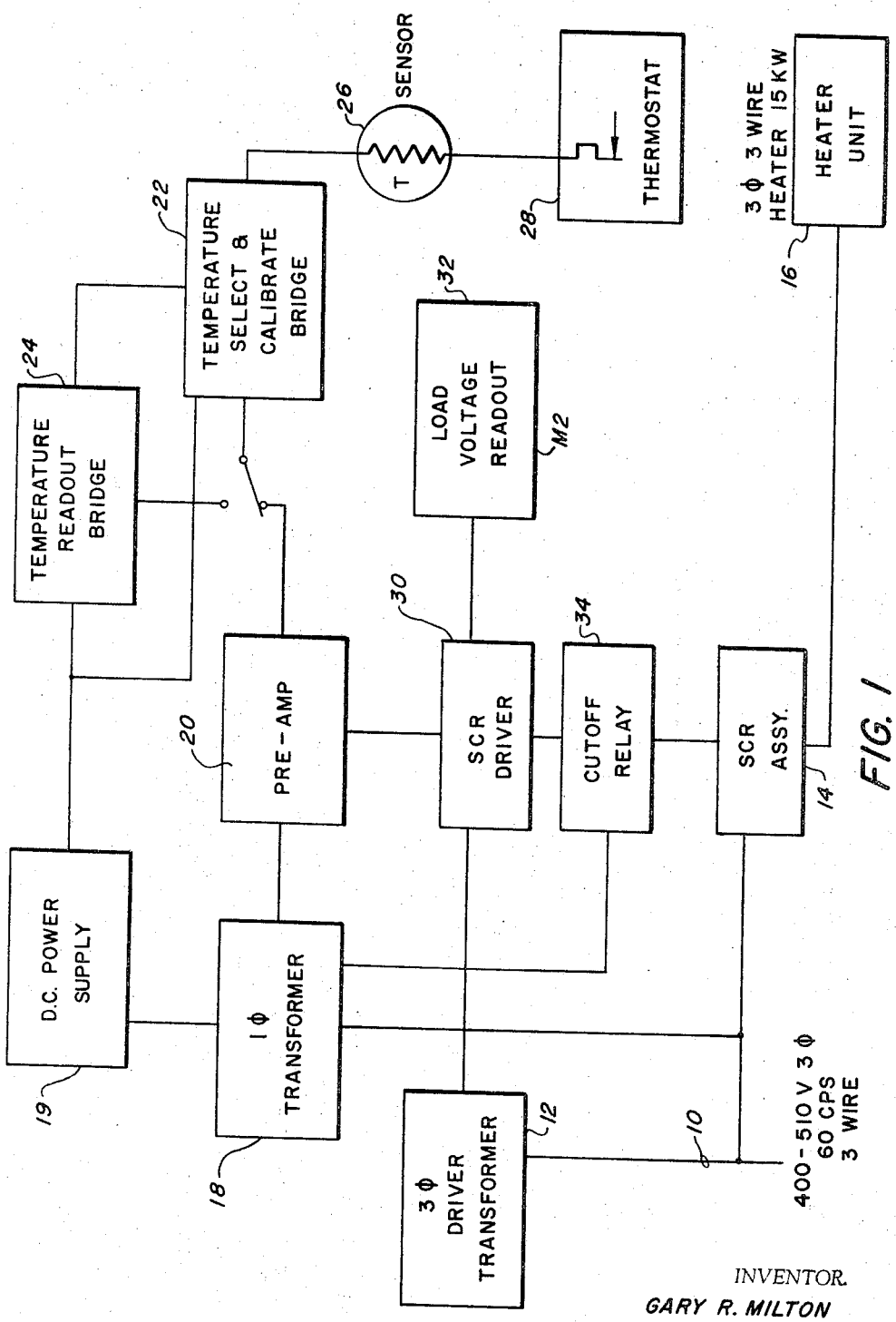

INVENTOR.
GARY R. MILTON

INVENTOR.
GARY R. MILTON

INVENTOR.
GARY R. MILTON

United States Patent Office 3,346,722
Patented Oct. 10, 1967

3,346,722
OIL WELL HEATING APPARATUS
CONTROL SYSTEM
Gary R. Milton, Bakersfield, Calif., assignor to American Thermoelectric Corp., a corporation of Ohio
Filed May 12, 1964, Ser. No. 366,818
15 Claims. (Cl. 219—499)

This invention relates to oil well heating apparatus and, more partciularly, to an improved electrical control system for an electrical oil well heating apparatus.

It is known in the art that the productivity of wells such as oil wells can be increased by heating the fluid in the bore hole. Numerous systems have been provided for heating the fluid in a bore hole, however, these systems exhibit a number of disadvantages. For example, a closed circuit, liquid system has been employed in which liquid, such as water, is heated in a tank on the surface of the earth and is pumped through pipes in the bore hole. The disadvantage of this system is that it is difficult to maintain the fluid temperature in very deep bore holes and it is difficult to control this temperature accurately. Attempts have been made to employ electrical systems in which cal rod type heaters are lowered into the bore hole; however, these systems also exhibit numerous disadvantages. For example, rod type heaters emit heat at a density of the order of 500 watts per square inch. This concentration of heat raises the bore hole fluid temperature but causes an undesirable decomposition of the oil. Thus, although the quantity of fluid pumped from the bore hole is increased, its quality is decreased. Further, if a hot spot develops on this type of heater, the hot spot is self-generating and grows, therefore ultimately decomposing relatively large volumes of the oil.

Certain of these known electrical systems include control arrangements which also exhibit disadvantages. For example, they fail to control the temperature of the fluid in the bore hole to a high degree of accuracy. They fail to include provision for sensing the bore hole fluid temperature. They do not include provision for turning off the power to the heater if the well is pumped dry or if the heating element is elevated above the fluid level. Further, these systems do not include any arrangement for compensating for the resistance of the heater leads which extend the length of the bore hole or for compensating for changes in the resistance of these leads due to increases in the depth of the bore hole. Still further, these systems contain no provision for reading or determining the acutal voltage on the heater elements or of monitoring the bore hole fluid temperature when the power is removed from the heater elements.

Accordingly, an object of this invention is to provide a control system for an electrical well heating apparatus which obviates the above disadvantages.

Another object of this invention is to provide, in an electrical oil well heating apparatus, an electrical control system for rapidly and accurately controlling the temperature of the bore hole fluid heater.

Yet another object of this invention is to provide, in an electrical control system for a well heater, a modulated control system which is on all of the time and therefore eliminates the transient effects of turning a system on and off and is more economical because of this continuous use.

Another object of this invention is to provide, in an oil well heating system, a sensing device which is employed to accurately control the power applied to the heater, which sensing device may also be employed to give a visual indication of the temperature of the fluid in the bore hole and the potential applied to the heater unit.

Still another object of this invention is to provide, in an electrical oil well control system for an oil well heater, provision for turning the system off if the temperature sensing device either becomes short circulated or open circuited, or, if the heater temperature exceeds a predetermined value.

A further object of this invention is to provide an oil well heating system with control devices to accurately control the power delivered to the heating unit so that the power dissipated per square inch is relatively low.

Yet a further object of this invention is to provide an electrical well heater control system with power disconnect means and monitor means for monitoring the well fluid temperature while the power is disconnected.

It is a still further object of this invention to provide, in an oil well heating system, a solid state control network which senses the temperature of the fluid in the bore hole and accurately controls the power delivered to the heating unit in accordance with this temperature.

Briefly, in accordance with aspects of this invention, a poly-phase power source is employed to energize a heating unit in a bore hole by connecting a separate power handling, controlled rectifier in series with each of the phases and one of the terminals of the heater unit. The system includes a provision for sensing the temperature in the bore hole and for controlling the power delivered through the controlled rectifiers in accordance with this temperature of the bore hole. Advantageously, the temperature of the bore hole is sensed by a temperature responsive resistance which may be selectively connected to a first and a second bridge circuit. The first bridge circuit is connected through a magnetic preamplifier to individual controlled rectifier firing circuits. The magnetic preamplifier is advantageously biased at the middle of its response curve so that either an unusually large signal (i.e., a short circuited sensor) or an unusually small signal (i.e., an open circuited sensor) will turn off the amplifier and result in a turn off of system power. Each of the firing circuits includes a magnetic amplifier and a controlled rectifier, the output of which is connected through a transformer to one of the power handling controlled rectifiers and also connected to one of the phases of the input power system to derive synchronizing pulses from the input power. Also advantageously, one of the firing circuits includes a meter for giving a visual indication of the potential applied directly across the bore hole heater. The first bridge includes means for correcting for the length of the leads to the sensor and coarse and fine temperature setting devices for setting the desired well fluid temperature. In accordance with another feature of the invention, the bore hole temperature sensing device is connected to the second bridge circuit which includes a meter for reading the temperature of the bore hole, which bridge circuit includes setting means for setting the meter for full scale reading and separate means for correcting for the length of the lead to the sensor.

In accordance with still further aspects of this invention, switching means are provided for interrupting the heater power while permitting monitoring of the temperature in the bore hole. In accordance with a still further feature of the invention, a thermostat is connected in circuit with the fluid temperature sensor and mounted adjacent the heater unit to cause the control system to interrupt the power supplied to the heater unit if the power supplied causes the temperature of the heater unit to exceed a predetermined safe value.

Yet another feature of this invention is the provision of a heater unit formed of a relatively flat, elongated ribbon conductor connected in a system to closely regulate the watt density of the power in the ribbon conductor to a relatively low value.

Figure 2A:
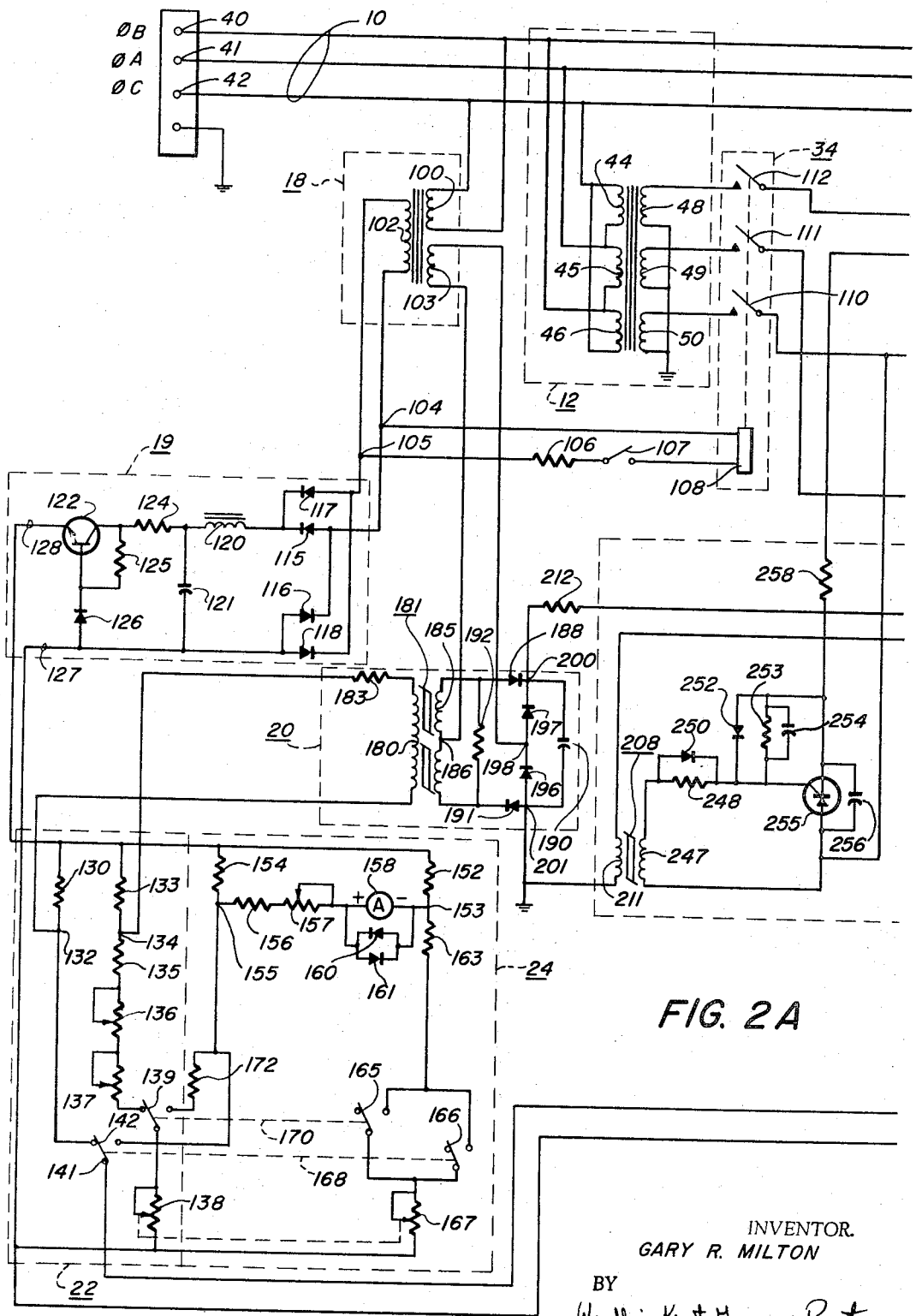
Figure 2B:
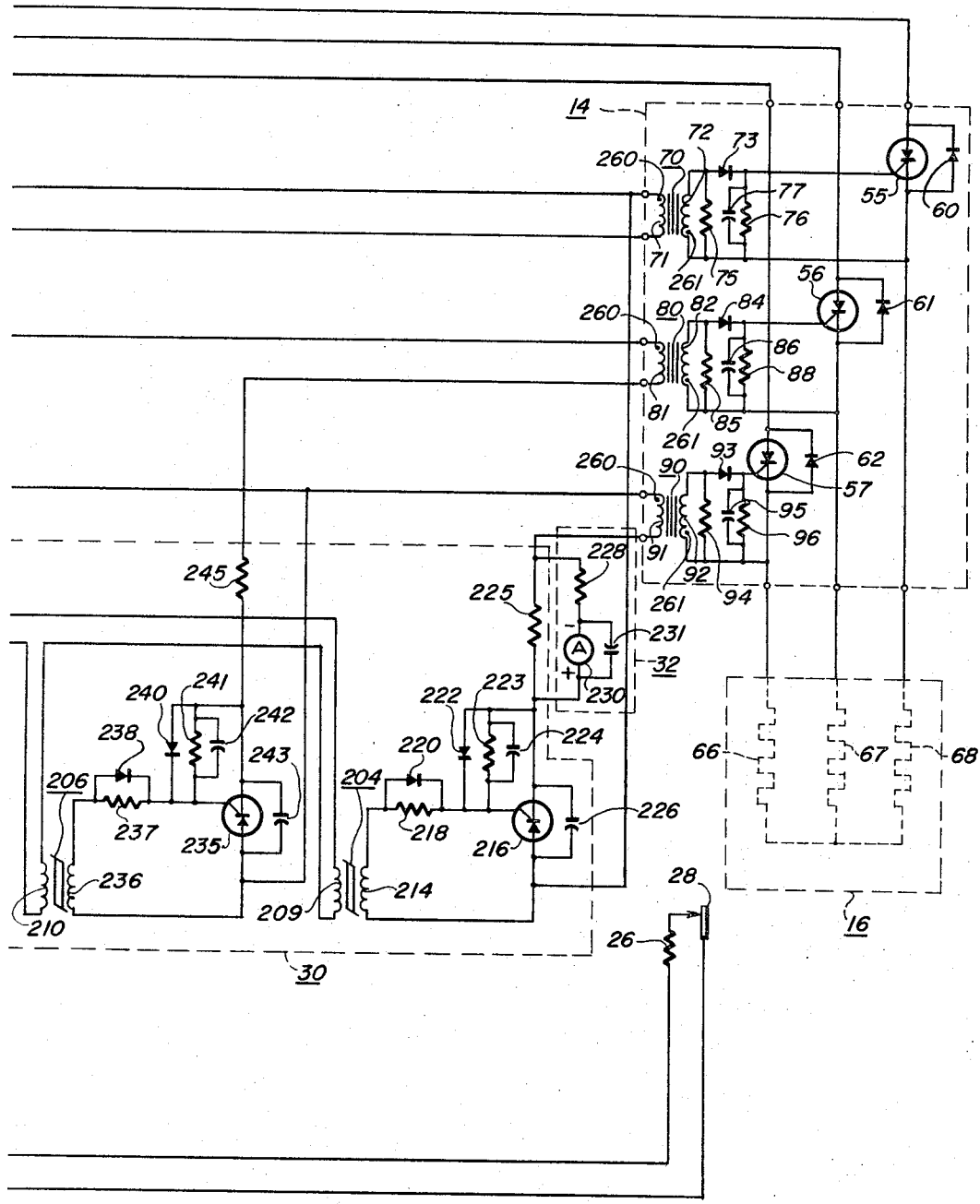

These and various other objects and features of the invention will be more clearly understood from a reading of the detailed description of the invention in which:

FIGURE 1 is a block diagram of one illustrative embodiment of well heater control system according to this invention; and FIGURE 2 is a schematic representation of a preferred embodiment of the invention.

FIGURE 1 shows a poly-phase input 10 which may be a three-phase, sixty-cycle line to which power of the order of 15 kilowatts is provided at a potential of the order of 400 to 500 volts phase-to-phase. This power is supplied from input 10 to a three-phase driver transformer 12 and is also supplied through a silicon controlled rectifier assembly 14 to a heater unit 16. The control system for the controlled rectifier assembly derives power partly from the three-phase transformer 12 and partly from a single-phase transformer 18, which is also connected to input 10. The control system includes a preamplifier 20 connected to the output of the single-phase transformer 18. The preamplifier 20 may be selectively connected to either of two bridge circuits. The first bridge circuit is a temperature select and calibrate bridge 22 and the second bridge is a temperature read-out bridge 24. Connected to the temperature select and calibrate bridge 22 is a temperature responsive circuit which includes temperature sensor 26 and thermostatic switch 28. The thermostatic switch 28 is preferably located immediately adjacent heater unit 16 to rapidly respond to temperature changes. The sensor 26 is preferably located above the heater unit 16 when they are positioned in the bore hole so the sensor senses bore hole fluid temperature rather than heater temperature. These temperature responsive devices cooperate with the control system to accurately limit and control the temperature of the heater and fluid and to provide a signal for producing a visual indication of fluid temperature. The output of preamplifier 20 and one of the outputs of the three-phase driver transformer 12 are connected to a silicon controlled rectifier driver stage 30. A voltage read-out stage 32 is connected to the silicon controlled rectifier driver stage 30 to give a visual indication of the potential applied directly across the heater 16. The output signals of the silicon controlled rectifier driver stage 30 are fed through a cutoff relay 34, which relay is controlled by a circuit including the single-phase transformer 18 and these signals are fed to the silicon controlled rectifier assembly 14 accurately to control the power delivered to the heater 16.

The schematic, illustrative, preferred embodiment of this invention is shown in FIGURE 2. The poly-phase output 10 includes input terminals 40, 41 and 42 to which three-phase power is supplied. The three-phase driver transformer 12 includes an input winding 44, a second input winding 45 and a third input winding 46. The input windings 44, 45 and 46 are connected together in delta arrangement and connected to terminals 40, 41 and 42. The output of driver transformer 12 includes a winding 48, a winding 49 and a winding 50 which are connected in Y-connection.

The silicon controlled rectifier assembly 14 includes a group of silicon controlled rectifiers 55, 56 and 57, each having their anode-cathode path serially connected between one of the input terminals 40, 41 and 42 and the heater element 16. A group of three thyrectors 60, 61 and 62 are each parallel connected in polarity opposition with one of silicon controlled rectifiers 55, 56 and 57. These thyrectors assure alternating current on the heater 16 and protect the silicon controlled rectifiers against transients which might occur on the power line. Each of silicon controlled rectifiers 55, 56 and 57 includes a gate electrode to which gating or firing pulses must be applied before the controlled rectifier will conduct alternating current from the terminals 40, 41 and 42 to the heaters 16. These pulses are developed through a modulating type control system which will be subsequently described. When the controlled rectifiers 55, 56 and 57 are selectively rendered conducting, they conduct pulses of power to a group of three heater elements 66, 67 and 68 of the heater unit 16, which heating elements are connected in Y-configurations.

The resistance elements 66, 67 and 68 are preferably formed as expanded, flat surfaces by spraying, sputtering, or otherwise placing a layer of resistive material such as carbon or metal on a pipe coated with glass cloth coated with epoxy resin or some other insulating material. The resistive material in areas between the resistive elements may be cut away and the several elements 66, 67 and 68 Y-connected by a flat bus of copper. The heating unit is then coated with a chemically resistive layer such as glass cloth and epoxy resin and suitable substantially flat terminals are connected to the elements and to the power cable connecting the heating units 16 to rectifier 55, 56 and 57.

If the firing pulses are applied relatively late in the respective potential cycle, the controlled rectifiers conduct over only a short period of each cycle and a relatively small amount of power is delivered to the heating units 66, 67 and 68. If, however, gating pulses are applied to the gate electrodes relatively early in the respective potential cycle, the controlled rectifiers are on for a relatively long period and a relatively large amount of power is supplied to the heating unit 16. Each of controlled rectifiers 55, 56 and 57 ceases to conduct when the forward cathode-anode potential falls below a predetermined value.

The gate circuit of controlled rectifier 55 includes a transformer 70 having a primary winding 71 and a secondary winding 72. One terminal of the secondary winding 72 is connected through a rectifier 73 to the gate electrode of controlled rectifier 55. The other terminal of the secondary winding 72 is connected directly to the cathode electrode. A resistor 75 is connected across the secondary winding 72 to act as a uniform load for the secondary winding and a resistor-capacitor parallel network 76, 77, respectively, is connected in parallel between the gate electrode of controlled rectifier 55 and the cathode electrode. The purpose of capacitor 77 is to store the pulses which are transmitted through the rectifier 73 to thus maintain a substantially longer firing pulse across the gate and cathode electrode than would be present without capacitor 77. The resistor 76 decreases the sensitivity of the controlled rectifier 55. This decrease in sensitivity causes controlled rectifier 55 to fire only on positive pulses on its gate electrode whereas, in the absence of this resistor 76, the rectifier 55 might fire with negative pulses on its gate electrode. The gate circuits of rectifiers 56, 57 are identical to the previously described gate circuit of rectifier 55 and will not be described in detail. The gate circuit of rectifier 56 includes transformer 80 having a primary winding 81 and a secondary winding 82, a serially connected diode 84, a shunt connected resistor 85 and a parallel network including a capacitor 86 and resistor 88. Similarly, the gate circuit of rectifier 57 includes a transformer 90 having a primary winding 91 and a secondary winding 92, a diode 93 serially connected between the secondary winding 92 and the gate electrode of rectifier 57, a resistor 94 connected across the secondary winding 92, a capacitor 95 and a resistor 96 connected in parallel between the gate and cathode electrodes of rectifier 57.

The single-phase transformer 18 includes a primary winding 100 and a pair of output windings 102, 103. The output winding 102 provides a relatively low output voltage such as the order of 40 volts from an input to the primary winding 100 of the order of 510 volts, while the output winding 103 provides an output of the order of 7 volts. The output of winding 102 is fed to a pair of terminals 104, 105 to which is connected a control circuit including a resistor 106, a serially connected single pole, single throw switch 107 and a relay winding 108. A group of three contacts 110, 111 and 112 is operatively associated with winding 108, each connected in series with one of the output windings 48, 49 and 50 of three-phase driver transformer 12 and one of the input windings 71, 81, 91 of transformers 70, 80 and 90. The winding 108 and its associated contacts 110, 111 and 112 constitute the cutoff relay 34 previously described in conunction with FIGURE 1.

During the operation of the system, the switch 107 is closed, causing the winding 108 to close its associated contacts 110, 111 and 112. If, however, a malfunction occurs in the system, the switch 107 may be manually opened to cause the power to the heater elements 66, 67 and 68 to be turned off. The system continues to monitor the fluid temperature by means of sensor 26. The opening of contacts 110, 111 and 112 interrupts the synchronizing pulses supplied from transformer 12 to the controlled rectifier driver circuit 30, the details of which will be subsequently described.

The regulated direct current power supply 19 includes a pair of diodes 115, 116 connected in polarity opposition to terminal 104 and a second pair of diodes 117, 118 also connected in polarity opposition and connected to terminal 105. Power supply 19 includes a serially connected inductance 120 connected to the cathodes of rectifiers 115, 117 and a shunt connected capacitor 121 between the opposite terminal of inductance 120 and the anodes of rectifiers 116, 118. Power supply 19 includes a voltage regulator circuit including a transistor 122 having its collector electrode connected through a resistor 124 to the inductance 120, a resistor 125 connected between the collector and base electrodes of transistor 122 and a Zener diode 126 connected between the base electrode of transistor 122 and the anodes of rectifiers 116, 118. The regulating operation of this voltage regulator circuit is determined by the voltage characteristic of Zener diode 126 which maintains a substantially constant potential between the resistor 125 and the rectifiers 116, 118 and thus maintains a substantially constant current flow through the transistor 124 to the bridge circuits 22, 24 through a pair of terminals 127, 128.

These terminals 127, 128 constitute the power input terminals to the bridges 22, 24. The bridge 22 is a control bridge for selecting the temperature to which the bore hole fluid is to be heated and for correcting for the resistance of the senor lead. Resistor 130 constitutes one leg of the bridge 22 and is connected between power input terminal 128 and a diagonal bridge terminal 132, which diagonal terminal is also one of the input terminals for the preamplifier circuit 20. A resistor 133 defines another leg of the bridge 22 and is connected between input terminal 128 and a second diagonal terminal 134, which constitutes the other input terminal of the preamplifier 20. The third leg of the bridge 22 is connected to resistor 133 and includes a fixed resistor 135, a coarse variable resistor 136 which constitutes the coarse temperature setting control for the system, a fine temperature setting variable resistor 137 and a variable resistor 138 which is employed to correct for the resistance of the senor leads in a manner which will be subsequently described. Variable resistor 137 is connected to variable resistor 138 through a switch 139, the purpose of which will be subsequently described. The remaining, or fourth, leg of the bridge is defined by a series circuit including the sensor 26 and thermostat 28, which series circuit is connected between terminals 127, 141, the latter terminal being a terminal of a switch 142.

The temperature read-out bridge 24 is also connected between terminals 127, 128 and includes a first resistor 152 connected to terminal 128 and a terminal 153 and defining one leg of the bridge 24, terminal 153 defining one diagonal terminal of the bridge 24, a resistor 154 defining another leg of the bridge and connected between terminal 128 and a diagonal terminal 155. A series-parallel circuit is connected between the diagonal terminals 153, 155 and includes a fixed resistor 156, a serially connected variable resistor 157, a meter 158 and a pair of oppositely poled, parallel connected diodes 160, 161 connected in parallel with the meter to act as meter protective devices. The third leg of the bridge is between diagonal terminal 153 and power input terminal 127 and includes a fixed resistor 163, a pair of parallel connected switches 165, 166 and a variable resistor 167 which serves to correct for the resistance of the sensor lead when reading the temperature in a manner which will be subsequently described.

The switches 166 and 142 are mechanically linked together as indicated by the dotted line 168 and are simultaneously moved to their right hand positions only when it is desired to read the temperature of the fluid in the bore hole, otherwise, they remain in their left hand position, as viewed in FIGURE 2. Switch 165 is mechanically linked to switch 139 as indicated by dotted line 170 and these switches are moved to their right hand positions when it is desired to set the meter 158 for its full scale setting by adjusting resistor 157. The last, or fourth, leg of the bridge 24 is defined by sensor 26, thermostat 28 and switch 142.

When it is desired to adjust bridge 24 for full scale reading, switches 139, 165 are moved to their right-hand position, as viewed in FIGURE 2, and resistor 157 is adjusted until meter 158 reads full scale. Switches 139, 165 are now moved to their left-hand position and remain in this position until it is necessary to check the calibration of the meter. Variable resistors 138, 167 are employed to correct bridges 22, 24, respectively, for the resistance of the wire connecting the sensor 26 and the thermostat 28 to thus increase the sensitivity of the bridges. The settings of these resistors 138, 167 are made equal to a value of computed resistance for the sensor 26, thermostat 28 leads. The coarse and fine temperature setting resistors 136, 137, respectively, are calibrated in degrees Fahrenheit and are set at the temperature to which it is desired to heat the well fluid.

The preamplifier 20 includes a control winding 180 of a magnetic amplifier 181, which control winding is connected to terminal 132 of bridge 22, and the other end of the control winding 180 is connected through a resistor 183 to the terminal 134 of bridge 22. A secondary, or controlled, winding 185 of magnetic amplifier 181 has a center tap 186 which is connected to one of the output terminals of output winding 103 of single-phase transformer 18. A series circuit is connected across the controlled winding 185 and includes a first diode 188, a capacitor 190, and a second diode 191. Also, a resistor 192 is connected across the controlled winding 185 to receive a part of the modulated current from winding 185. A pair of rectifiers 196, 197 is serially connected between the cathode of diode 188 and the anode of diode 191. A terminal 198 between diodes 196 and 197 is connected to the other terminal of output winding 103 of single-phase transformer 18. Accordingly, single-phase alternating current is applied to the terminals 186, 198 and rectified to direct current.

The output terminals of preamplifier 20 are terminals 200 and 201 and the circuit operates as follows. If sufficient direct control current is flowing through the control winding 180 from bridge 22 to maintain the magnetic amplifier 181 intermediate its terminal degrees of saturation, that is, neither completely saturated nor completely unsaturated, direct current pulses will flow in the output winding 185. These direct current pulses are obtained from rectifiers 188, 197, 196 and 191 which rectify alternating current fed from the transformer output winding 103. If the current flowing through the control winding 180 increases or decreases due to corresponding changes in the resistance of sensor 26, the output current at terminals 200, 201 is modulated correspondingly. These current changes are applied as pulses to the firing circuit, or driver circuit 30 to which, in turn, cause a converse effect on the conduction of controlled rectifiers 55, 56 and 57.

The silicon controlled rectifier driver circuit 30 includes a group of three magnetic amplifiers 204, 206 and 208 having their control windings 209, 210 and 211 serially connected between terminals 200 and 201 by means of a resistor 212. The control function of control windings 209, 210 and 211 of magnetic amplifiers 204, 206 and 208, respectively, is identical to that described in conjunction with magnetic amplifier 181 and its associated control winding 180. Magnetic amplifier 204 includes an output winding 214 which is connected to the anode of a silicon controlled rectifier 216 and a resistor 218 connects the output winding 214 to the gate electrode of controlled rectifier 216. A diode 220 is connected in parallel with the resistor 218 and another diode 222 is connected between the cathode and gate electrodes of controlled rectifier 216. A resistor 223 and a capacitor 224 are connected in parallel with the diode 222. The cathode of controlled rectifier 216 is connected through a resistor 225 to winding 91 of transformer 90. A capacitor 226 is connected between the anode and cathode electrodes of controlled rectifier 216. The anode of rectifier 216 is connected through contact 112 to winding 48.

The load voltage read-out circuit 32 of FIGURE 1 is connected in parallel with resistor 225 and includes a resistor 228, a meter 230 and a capacitor 231. The resistor and meter are serially connected. The capacitor 231 is connected in parallel with the meter 230. Advantageously, the meter 230 is calibrated to read the potential applied across the resistive elements 66, 67 and 68 of the oil well heater unit 16, i.e., the potential at the end of the cable connected to heater unit 16. This relationship exists because the meter 230 reads the amplified output signal of the bridge 22 which has been compensated for sensor lead lengths. Thus the meter 230 gives a true reading of the power applied to the heater elements 66, 67 and 68.

The portion of the controlled rectifier driver circuit 30 including magnetic amplifier 204 and controlled rectifier 216 acts as the driver, or firing, circuit for the controlled rectifier 57. The portion of circuit 30, including magnetic amplifier 206 and a silicon controlled rectifier 235, acts as the driver, or firing, circuit for controlled rectifier 56. This firing circuit, or control circuit, includes an output winding 236 of the magnetic amplifier 206, a resistor 237 connected between the winding 236 and the gate electrode of controlled rectifier 235. This firing circuit also includes a diode 238 connected in parallel with the resistor 237, a diode 240, a resistor 241 and a capacitor 242 all connected in parallel between the cathode and gate electrode of controlled rectifier 235 and a capacitor 243 connected between the cathode and anode electrodes of controlled rectifier 235. This firing circuit is connected to winding 81 of transformer 80 through a resistor 245.

The controlled rectifier driver circuit, or firing circuit, for controlled rectifier 55 includes magnetic amplifier 208 and an output winding 247 thereof, a resistor 248, a diode 250 connected in parallel with resistor 248, a diode 252, a resistor 253 and a capacitor 254 all connected in parallel between the cathode and gate electrodes of a controlled rectifier 255. A capacitor 256 is connected between the anode and cathode electrodes of controlled rectifier 255. The cathode of controlled rectifier 255 is connected through a resistor 258 to winding 71 of transformer 70 for the purpose of supplying firing pulses through the secondary winding 72 and diode 73 to the gate and cathode electrodes of controlled rectifier 55.

In the operation of the system, the switch 107 is manually closed and three-phase power is connected to the input 10, the relay 108 will be energized and the contacts 110, 111 and 112 will be closed. An output potential of approximately 18.5 volts between phases will appear at the output windings 48, 49 and 50, which potential will cause current flow through the respective primary windings 71, 81 and 91 and the respective resistors 258, 245, 225 to the respective portions of firing circuits 30. This potential delivers positive pulses through the respective diodes 252, 240 and 222 to the respective gate electrodes of silicon controlled rectifiers 216, 235 and 255. These positive pulses combine with the positive pulses flowing from the output windings 214, 236 and 247 of the respective magnetic amplifiers 204, 206 and 208 through the respective diodes 220, 238 and 250 to trigger or fire the respective driver circuit controlled rectifier.

The application of synchronizing pulses to the windings 71, 81 and 91 will not produce firing pulses on the gates of controlled rectifiers 55, 56 and 57 because of the opposite winding relationship of the primary and secondary windings as indicated by dots 260, 261 and because of the presence of the serially connected diodes 73, 84 and 93, respectively. When the controlled rectifiers 216, 235 and 255 conduct, they will continue to conduct as long as the cathode-anode potential is sufficient and in the proper polarity. The instant at which conduction in the respective half cycles takes place is therefore determined by the amount of current fed, or induced, from the respective control winding of the respective magnetic amplifier 204, 206 or 208 to thereby control the pulse duration of the output pulse. These output, or firing, pulses are fed through their respective transformers 70, 80 and 90 and diodes 73, 84 and 93 to the gate electrodes of rectifiers 55, 56 and 57 to control the initiation of the firing of the controlled rectifiers 55, 56 and 57. If the controlled rectifier 55, for example, is fired or has a firing pulse applied to its gate electrode relatively early in the cycle of the three-phase power pulse applied between its cathode and anode electrodes, a relatively large amount of power is transmitted through the controlled rectifier 55 to its respective resistance unit 68 of the heater unit 16. A similar operation takes place in a sequence for the rectifiers 56 and 57.

When the heating apparatus is lowered into the bore hole, the desired temperature setting is adjusted at resistance 136 and 137 for adjusting the coarse and fine settings, respectively of the desired temperautre. The resistor 138 is adjusted to correct for the resistance (calculated) of the length of the lead between the bridge 22 and the sensor 26. The thermostat 28 is normally closed and is preferably set to open at 280° F. plus or minus 5° F. to act as a protective device to turn off the power to the heater. If, after the heating unit is placed in the bore hole fluid, the fluid falls below the heater unit 16 or the unit is raised out of the fluid, the temperature of the heater with which the thermostat 28 is operatively associated will exceed the thermostat setting of 280° F., plus or minus 5° F. and the thermostat opens. The bridge 22 becomes unbalanced by the opening of the thermostat causing a relatively large amount of current to flow in the control winding 180 of magnetic amplifier 181 which results in saturation of the magnetic amplifier and the turn-off of modulated output signals from the terminals 200, 201. This turn-off results in a turn-off of the firing circuit 30 so that firing circuit controlled rectifiers 216, 235 and 255 cannot fire even though synchronizing pulses are being applied through the respective rectifiers 222, 240 and 252. Thus, firing pulses will not be supplied to the gate electrodes of controlled rectifiers 55, 56 and 57 and the power to the heater will be instantly turned off. If the temperature of the heater decreases to a value to permit the thermostat 28 to close, such as by lowering the unit 16 into the fluid, the bridge again becomes substantially balanced. When the thermostat closes, a relatively small amount of current flows through the control winding 180 and the firing circuit controlled rectifiers will again be able to fire when they receive synchronizing pulses and the power will again be applied through the controlled rectifiers 55, 56 and 57 to the heating unit 16. This novel arrangement of control system provides a system which, in one illustrative embodiment, accurately controls the temperature between plus or minus two and a half degrees Fahrenheit of the set point to which it is set by means of variable resistors 136, 137.

If it is desired to read the temperature of the bore hole fluid, the switches 142, 166 are moved to their right-hand position and the reading on the meter 158 will indicate the temperature of the bore hole fluid as determined by the sensor 26. Advantageously, the sensor is a temperature responsive resistance and may be of the order of 500 ohms at 120° F. and may have a temperature coefficient of the order of 0.0025 ohm per ohm per degree Fahrenheit. Preferably, the amount of power supplied to the heaters is of the order of 15 kilowatts and the resistances of the heater units 66, 67 and 68 are of the order of 15.35 ohms. Because heater units 66, 67 and 68 are spread over a relatively large area, the power dissipated per unit area is low. In one embodiment, the power dissipated is of the order of 8 to 9 watts per square inch even though the total heater power is of the order of 15 kilowatts. With this low value of power dissipation per unit area, decomposition of the bore hole fluid is precluded. The input voltage at input 10 may be of the order of 400 to 510 volts, three-phase, three-wire or four-wire, at 60 cycles per second.

It is possible to take a reading of the bore hole fluid temperature even though power is not supplied to the heater unit 16 by opening switch 107. This de-energizes relay 108, opening contacts 110, 111 and 112 and thus opening the synchronizing pulse circuits. Without synchronizing pulses, rectifiers 216, 235 and 255 cannot fire and control pulses cannot be fed to rectifiers 55, 56 and 57. The bridge 24 remains energized from transformer 18 and power supply 19 and the sensor temperature (and bore hole fluid temperature) may be read on meter 158 by moving switches 142, 166 to the right, as viewed in FIGURE 2.

While I have shown and described certain embodiments of this invention, it is understood that the concepts thereof can be applied to other embodiments without departing from the spirit and scope of this invention.

What is claimed is:

1. In a well heater control system, the combination comprising:
   resistive heater means;
   power control means including controlled rectifier means coupled to said heater means, each of said controlled rectifier means including a control electrode;
   poly-phase power input means coupled to said controlled rectifier means; and
   temperature responsive control means for applying a control signal to each of said control electrodes including
      sensor means for sensing the temperature of the fluid in said well,
      bridge means coupled to said sensor means,
      modulator means coupled to said bridge means and to said power input means for modulating a signal with the signal from said sensor means,
      synchronizing means coupled to said poly-phase input means and to each of said control electrodes, and
      gate means coupled to said synchronizing means and to said modulator means and also coupled to each of said control electrodes for delivering a signal to said control electrodes in accordance with the combination of the signals from said sensor meons and from said synchronizing means.

2. In a well heating system, the combination comprising:
   heating means having a plurality of inter-connected resistance elements;
   controlled rectifier means connected to said elements, each of said controlled rectifier means including a control electrode;
   poly-phase power input means connected to said controlled rectifier means;
   sensing means for sensing the temperature of the fluid in said well;
   bridge means connected to said sensing means and including temperature setting means;
   modulator means connected to said bridge means for modulating a signal in accordance with the temperature indicated by said sensing means;
   driver means coupled to said modulator means and to said control electrodes; and
   synchronizing means coupled to said poly-phase power input means and to said control electrodes for applying synchronizing pulses to said control electrodes.

3. In a well heater control system,
   a well heating unit including a plurality of inter-connected heater elements;
   controlled rectifier means connected to each of said heater elements, said controlled rectifier means each including a control electrode; and
   control means for applying a control signal to each control electrode in accordance with the temperature of the fluid in the well including
      sensor means for sensing the temperature of said well,
      bridge means connected to said sensor means and including temperature adjusting means and lead length correction means,
      modulator means connected to said bridge means and to a source of electrical current for modulating a signal in accordance with the temperature of the fluid in said well,
      driver means connected to said modulator means and including an amplifier for each of said controlled rectifiers;
      gate means coupled to each of said amplifiers and to each of said control electrodes of said controlled rectifiers, and
      synchronizing means coupled to said gate means and to said driver means for combining a synchronizing signal with the signal from said driver means to actuate said gate means and thereby apply a firing signal to said control electrodes.

4. In an oil well heater control system, the combination comprising:
   a plurality of inter-connected resistance elements;
   controlled rectifiers connected to each of said resistance elements and each including a control electrode;
   poly-phase power input means connected to each of said controlled rectifiers; and
   control means connected to each of said control electrodes for selectively firing said controlled rectifiers in accordance with the temperature of the fluid in the well, said control means including
      sensor means for sensing the temperature of the fluid in the well,
      bridge means for generating a signal indicative of the temperature of said sensor means and including variable resistance means for correcting said bridge means in accordance with the resistance of the leads to said sensor means,
      modulator means,
      means coupling said sensor means to said modulator means,
      driver means connected to said modulator means,
      controlled rectifier means connected to said driver means and coupled to said control electrodes, and
      synchronizing means coupled to said power input means and to said controlled rectifier means.

5. A well heater control system comprising:
   a plurality of resistance elements inter-connected in a poly-phase network;
   a plurality of controlled rectifiers, each including a control electrode and each connected to one of said resistance elements;
   poly-phase power input means coupled to each of said controlled rectifier means; and
   control means for controlling the power applied to said controlled rectifiers in accordance with the temperature of the fluid in a well and including
- sensor means for sensing the temperature of said well,
- bridge means connected to said sensor means for adjusting the temperature to which said control system is to control said heater,
- modulator means connected to said bridge means and including a magnetic amplifier having its control winding connected to said bridge means,
- means for applying a signal to be modulated to said modulator means,
- amplifier means connected to the output of said modulator means and including an individual magnetic amplifier for each of said control electrodes,
- gate means connected to each of said magnetic type amplifiers, and
- synchronizing means connected to said poly-phase input means and to said gate means for synchronizing the operation of said gate means with the power applied to said controlled rectifiers.

6. In a poly-phase well heater control system, the combination comprising:
- a poly-phase input;
- a poly-phase connected heater unit;
- a plurality of controlled rectifiers, each including a control electrode and each connected between said poly-phase input and said heater unit; and
- control means connected to each of said control electrodes and including
  - a temperature responsive sensor positioned to detect the temperature of the fluid in said well,
  - bridge means connected to said sensor for adjusting the temperature setting of said system and for delivering an output signal indicative of the resistance of said sensor,
  - modulator means connected to said bridge means and including a magnetic amplifier having a control winding connected to said bridge means,
  - means for applying pulses of direct current to said modulator means,
  - magnetic amplifier means including a plurality of control windings, each connected to the output of said modulator means,
  - a plurality of controlled rectifier gates, each connected to one of said magnetic amplifiers and each coupled to one of said control electrodes, and
  - synchronizing means for applying a synchronizing signal to each of said controlled rectifier gates.

7. In an poly-phase well heater temperature control system,
- a poly-phase input;
- a poly-phase connected heater unit;
- a plurality of controlled rectifiers, each serially connected between said poly-phase input and said heater unit and each including a control electrode;
- sensor means connected to said system for indicating the temperature of the fluid in said well;
- bridge means connected to said sensor means and including temperature adjusting means for selecting the temperature to which said heater unit is to be controlled;
- a magnetic amplifier modulator having a control winding connected to said bridge means;
- direct current source means connected to said magnetic amplifier modulator;
- output means connected to said magnetic amplifier modulator;
- a plurality of firing circuit magnetic amplifiers, each having a control winding serially connected to said magnetic amplifier modulator, each of said firing circuit magnetic amplifiers having a controlled winding;
- a plurality of firing circuit controlled rectifiers, each having two electrodes connected to one of said controlled windings; and
- coupling means coupling each of said firing circuit controlled rectifiers to one of said control electrodes;
- synchronizing means coupled to said poly-phase input means and including a plurality of diodes, each connected between two of the electrodes of one of said firing circuit and controlled rectifiers.

8. In an electrical system for heating a well, the combination comprising:
- a Wheatstone bridge including as one leg thereof a temperature responsive reasistor and a serially connected thermostat;
- modulator means connected to said bridge for delivering an output signal modulated in accordance with the resistance of said temperature responsive resistance and including a magnetic amplifier having its control winding connected to said bridge;
- amplifier means connected to the output of said modulator means;
- power input means;
- heater means for heating said well;
- controlled rectifier means connected between said power input means and said heater means; and
- gate means connected betwen said amplifier means and said controlled rectifier means for applying a gating signal to said controlled rectifier means in accordance with said output signal.

9. The combination according to claim 8 further comprising load voltage read-out means for accurately reading the voltage applied directly to said heater means.

10. The combination according to claim 8 further comprising temperature read-out means coupled to said temperature responsive resistor for indicating the temperature of the fluid in said well.

11. A three-phase electrical well heater system comprising:
- a well heater inclding a plurality of resistive elements connected in a three-phase network;
- a controlled rectifier for each phase connected to said heater, each of said controlled rectifiers including a control electrode;
- input means for supplying three-phase power to each of said controlled rectifiers; and
- control means for controlling the firing of said controlled rectifiers by applying a control signal to each of said control electrodes and including
  - sensor means for sensing the temperature of said well,
  - bridge means including cable means connected to said sensor means,
  - modulator means connected to the output of said bridge means,
  - amplifier means connected to the output of said modulator means,
  - a firing circuit including a firing circuit controlled rectifier for each phase and a magnetic amplifier for each firing circuit controlled rectifier and each having a control winding and a controlled winding, means connecting each of said control windings to said modulator means, means coupling each of said controlled windings to one of said firing circuit controlled rectifiers, means coupling each of said firing circuit controlled rectifiers to one of said control electrodes, and
  - synchronizing means coupled to said input means for applying a synchronizing pulse to each of said firing circuit controlled rectifiers.

12. The combination according to claim 11 wherein said bridge means includes temperature setting means for setting the temperature to which said heater is to be heated.

13. The combination according to claim 12 further including cable resistance correction means in said bridge means for correcting said bridge for the resistance of said cable means.

14. The combination according to claim 11 further including visual temperature read-out means connected to said sensor means.

15. The combination according to claim 11 further comprising:
temperature read-out means coupled to said sensor means;
load voltage read-out means coupled to one of said amplifier means for indicating the voltage applied to said resistive elements;
thermostat means connected in series with said sensor means for opening the circuit of said sensor means in response to a predetermined heater temperature;
synchronizing means coupled between said input means and said firing circuit; and
cut-off means for disconnecting said synchronizing means from said input means.

References Cited

UNITED STATES PATENTS

| | | | |
|---|---|---|---|
| 3,131,545 | 5/1964 | Gross et al. | 321—23 |
| 3,159,737 | 12/1964 | Dora | 219—499 |
| 3,175,077 | 3/1965 | Fox et al. | 219—501 |
| 3,202,800 | 8/1965 | Phillips et al. | 219—499 |
| 3,240,916 | 3/1966 | Bray et al. | 219—501 |

RICHARD M. WOOD, *Primary Examiner.*

L. H. BENDER, *Assistant Examiner.*